(12) United States Patent
Simek

(10) Patent No.: US 12,460,463 B2
(45) Date of Patent: Nov. 4, 2025

(54) SHOWER DOOR GUIDE ASSEMBLY

(71) Applicant: LIBERTY HARDWARE MFG. CORP., Winston-Salem, NC (US)

(72) Inventor: Thomas Simek, Winston-Salem, NC (US)

(73) Assignee: LIBERTY HARDWARE MFG. CORP., Winston-Salem, NC (US)

( * ) Notice: Subject to any disclaimer, the term of this patent is extended or adjusted under 35 U.S.C. 154(b) by 0 days.

(21) Appl. No.: 18/768,615

(22) Filed: Jul. 10, 2024

(65) Prior Publication Data

US 2024/0360713 A1  Oct. 31, 2024

Related U.S. Application Data

(62) Division of application No. 18/299,267, filed on Apr. 12, 2023, now Pat. No. 12,060,738, which is a division of application No. 17/192,015, filed on Mar. 4, 2021, now Pat. No. 11,655,658.

(51) Int. Cl.
  *E05D 15/06* (2006.01)
  *A47K 3/34* (2006.01)

(52) U.S. Cl.
  CPC ............ *E05D 15/0656* (2013.01); *A47K 3/34* (2013.01); *E05D 15/063* (2013.01); *E05D 15/0652* (2013.01); *E05Y 2201/684* (2013.01); *E05Y 2201/688* (2013.01); *E05Y 2900/114* (2013.01)

(58) Field of Classification Search
  CPC ........................ E05D 15/0656; E05D 15/0652; Y10T 16/361
  See application file for complete search history.

(56) References Cited

U.S. PATENT DOCUMENTS

| | | | |
|---|---|---|---|
| 2,750,622 A | * | 6/1956 | Stark .................. E05D 15/0656 16/90 |
| 2,939,167 A | | 6/1960 | Preston |
| 3,118,169 A | | 1/1964 | Foltz |
| 3,132,371 A | | 5/1964 | Enos et al. |
| 3,205,529 A | | 9/1965 | Vintan |
| 3,298,056 A | | 1/1967 | Hentzi |
| 3,454,979 A | | 7/1969 | Harbertson |
| 3,493,990 A | | 2/1970 | Winn |
| 4,455,709 A | | 6/1984 | Zanini |

(Continued)

FOREIGN PATENT DOCUMENTS

| | | |
|---|---|---|
| CN | 203308297 U | 11/2013 |
| CN | 204002222 U | 12/2014 |

(Continued)

OTHER PUBLICATIONS

US 10,006,234 B2, 06/2018, Minkovich et al. (withdrawn)
Machine translation of DE102009057248A1.

*Primary Examiner* — Marcus Menezes
(74) *Attorney, Agent, or Firm* — Brooks Kushman P.C.; Lora Graentzdoerffer

(57) ABSTRACT

A guide assembly for a sliding shower door is provided with a bracket sized to be fastened to a shower door opening. The bracket has a first lengthwise retainer. A guide with a second lengthwise retainer is sized to be retained by the first lengthwise retainer of the bracket. The guide has at least one channel formed therein and is sized to receive a shower door pane within the channel for translation of the shower door pane relative to the guide.

18 Claims, 4 Drawing Sheets

(56) References Cited

U.S. PATENT DOCUMENTS

| | | |
|---|---|---|
| 5,598,666 A | 2/1997 | Kurth |
| 6,023,794 A | 2/2000 | Nein |
| 6,381,904 B1 | 5/2002 | Tedescucci |
| 9,486,114 B2 | 11/2016 | Ball et al. |
| 9,743,810 B2 | 8/2017 | Schultz et al. |
| 9,974,415 B2 | 5/2018 | Ball et al. |
| 9,980,614 B2 | 5/2018 | Austin, III et al. |
| 10,024,093 B2 | 7/2018 | Schultz et al. |
| 10,028,623 B1 | 7/2018 | Smith et al. |
| 10,036,190 B2 | 7/2018 | Minkovich et al. |
| D833,263 S | 11/2018 | Minkovich et al. |
| 10,123,660 B2 | 11/2018 | Ball et al. |
| 10,206,542 B2 | 2/2019 | Minkovich et al. |
| 10,213,059 B2 | 2/2019 | Ball et al. |
| 10,253,537 B2 | 4/2019 | Kreyenborg |
| 10,280,666 B2 | 5/2019 | Schultz et al. |
| 10,327,598 B2 | 6/2019 | Ball et al. |
| 10,610,060 B2 | 4/2020 | Ball et al. |
| 10,758,092 B2 | 9/2020 | Whitaker |
| 2009/0145039 A1 | 6/2009 | Shehoski |
| 2011/0072577 A1* | 3/2011 | Luedke .............. A47K 3/34 4/607 |
| 2019/0038084 A1 | 2/2019 | Abrams et al. |
| 2019/0254486 A1 | 8/2019 | Mironchuk et al. |
| 2019/0357733 A1 | 11/2019 | Romero |
| 2020/0149332 A1 | 5/2020 | Cano et al. |
| 2021/0285273 A1 | 9/2021 | Fang |

FOREIGN PATENT DOCUMENTS

| | | |
|---|---|---|
| CN | 205918332 U | 2/2017 |
| CN | 110199077 A | 9/2019 |
| DE | 102009041496 A1 | 4/2010 |
| DE | 102009057248 A1 | 6/2011 |
| EP | 2664262 B1 | 9/2017 |
| EP | 3295849 B1 | 4/2020 |

* cited by examiner

SHOWER DOOR GUIDE ASSEMBLY

CROSS-REFERENCE TO RELATED APPLICATIONS

This application is a division of U.S. application Ser. No. 18/299,267, filed Apr. 12, 2023, now U.S. Pat. No. 12,060,738 B2, which is a division of U.S. application Ser. No. 17/192,015 filed Mar. 4, 2021, now U.S. Pat. No. 11,655,658 B2, the disclosures of which are hereby incorporated in their entirety by reference herein.

TECHNICAL FIELD

Various embodiments relate to guide assemblies for shower door assemblies.

BACKGROUND

The prior art has provided guide assemblies for sliding shower door assemblies.

SUMMARY

According to an embodiment, a guide assembly is provided with a bracket sized to be fastened to a shower door opening. The bracket has a first lengthwise retainer. A guide with a second lengthwise retainer is sized to be retained by the first lengthwise retainer of the bracket. The guide has at least one channel formed therein and is sized to receive a shower door pane within the channel for translation of the shower door pane relative to the guide.

According to a further embodiment, at least one mounting aperture is formed through the bracket. The guide conceals the at least one mounting aperture.

According to another further embodiment, a pair of side plates, are each sized to be fastened to an end of the guide or the bracket to limit translation of the guide relative to the bracket.

According to yet another further embodiment, the first lengthwise retainer and the second lengthwise retainer are further provided with a tapered key and a body portion with a tapered keyway to retain the guide upon the bracket.

According to an even further embodiment, the first lengthwise retainer is further provided with the tapered key.

According to another even further embodiment, at least one mounting aperture is formed through the tapered key of the bracket.

According to another further embodiment, the guide is further provided with a pair of lengthwise projections extending away from the bracket with the channel formed therein.

According to an even further embodiment, the pair of lengthwise projections are each provided with an external surface spaced apart from the bracket and angled to direct water.

According to another embodiment, a shower door assembly is provided with a track sized to extend across a shower door opening. A shower door pane is sized to cooperate with the track for translation relative to the track. The shower door pane has a range of clearance relative to the track for installation and disassembly of the shower door pane relative to the track. A guide assembly is provided with a bracket sized to be fastened to the shower door opening. The bracket has a first lengthwise retainer. A guide with a second lengthwise retainer is sized to be retained by the first lengthwise retainer of the bracket. The guide has at least one channel formed therein and is sized to receive a shower door pane within the channel for translation of the shower door pane relative to the guide. A depth of the channel exceeds the range of clearance of the shower door pane relative to the track.

According to another embodiment, a shower door assembly is provided with a track sized to extend across a shower door opening. A shower door pane is sized to cooperate with the track for translation relative to the track. The shower door pane has a range of clearance relative to the track for installation and disassembly of the shower door pane relative to the track. A guide is sized to be installed to a shower door opening. The guide has at least one channel formed therein to receive the shower door pane for translation relative to the guide. A depth of the channel exceeds the range of clearance of the shower door pane relative to the track.

According to a further embodiment, a bracket is sized to be fastened to the shower door opening. The bracket has a first lengthwise retainer. The guide is further provided with a second lengthwise retainer sized to be retained by the first lengthwise retainer of the bracket.

According to an even further embodiment, at least one mounting aperture is formed through the bracket. The guide conceals the at least one mounting aperture.

According to another further embodiment, a pair of side plates are provided, each sized to be fastened to an end of the guide or the bracket to limit translation of the guide relative to the bracket.

According to another further embodiment, the first lengthwise retainer and the second lengthwise retainer are further provided as a tapered key and a body portion with a tapered keyway to retain the guide upon the bracket.

According to an even further embodiment, the first lengthwise retainer is further provided as the tapered key.

According to an even further embodiment, at least one mounting aperture is formed through the tapered key of the bracket.

According to another further embodiment, the guide is further provided with a pair of lengthwise projections extending upward from the guide with the channel formed therein.

According to an even further embodiment, the pair of lengthwise projections are each provided with an external surface spaced apart from the bracket and angled to direct water.

According to another embodiment, a method of assembling a shower door assembly installs a track to a shower stall. A shower door pane is installed to the track. A bracket is installed to the shower stall. A guide is slid onto the bracket between the bracket and the shower door pane to prevent disassembly of the shower door pane from the track.

According to a further embodiment, a pair of side plates is fastened to ends of the guide and the bracket to retain the guide upon the bracket.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
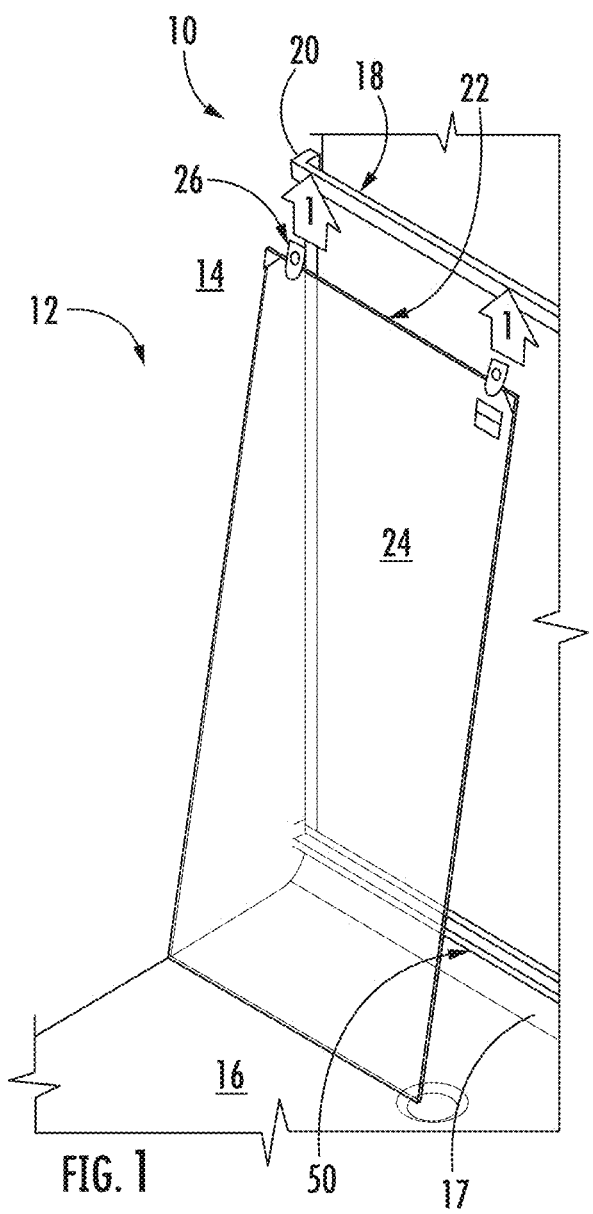
FIG. 1 is a perspective view of a shower door assembly according to an embodiment, illustrating an installation step.

FIG. 1 illustrates a shower door assembly 10 according to an embodiment. The shower door assembly 10 is illustrated during installation into a shower stall 12. The shower stall 12 includes a pair of sidewalls 14 and a floor 16. The shower stall 12 may also include a sill 17 extending up from the floor 16. The shower door assembly 10 includes a top track 18 that is installed to the pair of sidewalls 14 to span a length between the sidewalls 14. The shower door assembly 10 may include a pair of track brackets 20 that are fastened to the sidewalls 14 to support the top track 18.

A first shower door subassembly 22 is provided to be installed upon the top track 18 to translate relative to the top track 18. The first shower door subassembly 22 includes a shower door pane 24, which may be formed from tempered glass or any suitable material. The shower door pane 24 has a width that is less than a length of the top track 18 in order to translate the shower door pane 24 for ingress and egress of an occupant into and out of the shower stall 12.

The first shower door subassembly 22 includes a pair of roller assemblies 26 mounted to an upper region of the shower door pane 24. The roller assemblies 26 support the shower door pane 24 upon the top track 18. The roller assemblies 26 cooperate with the top track 18 to support the roller assemblies 26 and the shower door pane 24 upon the top track 18, while permitting translation of the first shower door subassembly 22 along the top track 18.

Figure 2:
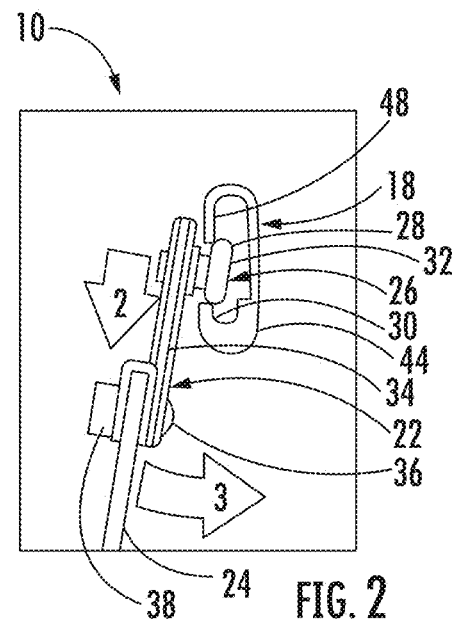
FIG. 2 is a side elevation view of an upper region of the shower door assembly of FIG. 1, illustrating another installation step.
Figure 3:
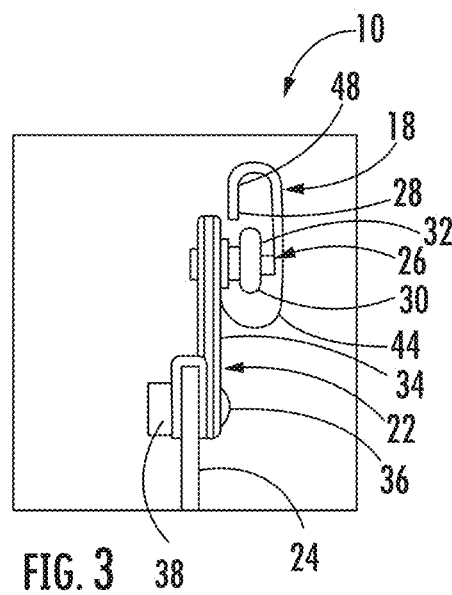
FIG. 3 is another side elevation view of the upper region of the shower door assembly of FIG. 1.

FIG. 1 illustrates the first shower door subassembly 22 during installation. The first shower door subassembly 22 is illustrated within the shower stall 12 and angled offset from vertical to approach an installation of the roller assemblies 26 upon the top track 18 by lifting in a direction of arrows labeled 1. FIG. 2 illustrates an upper region of the shower door assembly 10. The top track 18 includes a side opening 28 for access to a channel 30, which provides a track guide. The roller assemblies 26 each include a wheel 32 projecting from the shower door pane 24. The wheel 32 is sized to be inserted through the side opening 28 of the top track 18 to then rest upon the channel 30. Once the wheels 32 are inserted into the side openings 28, then the first shower door subassembly 22 is lowered in the direction of labeled arrow 2, and pivoted in a direction of labeled arrow 3 so that the wheels 32 are received in the channel 30 as illustrated in FIG. 3. Although the track 18 is illustrated with a side opening 28, any suitable track may be employed with any suitable openings for receipt of the wheels 32.

The roller assembly 26 includes a bracket 34 fastened to an upper end the shower door pane 24 by fasteners 36, 38. The limited clearance of the side opening 28 retains the wheel 32 within a cavity 48 in the top track 18 and prevents disassembly of the first shower door subassembly 22 from the top track 18 in the vertical orientation of the shower door pane 24. In order to install the first shower door subassembly 22, the shower door subassembly 22 is pivoted to an angle so that the wheel 32 can pass through the restricted side opening 28. Top tracks 18 are often installed with the side opening 28 facing into the shower stall 12 to provide a consistent and uninterrupted outer face 44 to be viewed externally. Therefore, the first shower door subassembly 22 may often be installed as an inner shower door subassembly 22 that is installed from within the shower stall 12 as illustrated in FIG. 1.

The shower door assembly 10 may include a lower dam strip 50 that is installed between the sidewalls 14 adjacent to the shower floor 16. In the depicted embodiment, the lower dam strip 50 is installed upon the sill 17. The shower door assembly 10 may also be employed without a lower dam strip.

FIGS. 4-7 illustrate a center guide assembly 52 for a lower end of the shower door assembly 10. The center guide assembly 52 may be installed upon the lower dam strip 50 of the shower door assembly 10 of FIG. 1. The center guide assembly 52 may also be installed directly upon the sill 17 in a shower door assembly 54 of FIG. 7.

The center guide assembly 52 includes a central divider 56. The center guide assembly 52 includes an inner retainer 58 with a channel 60 between the inner retainer 58 and the central divider 56. The center guide assembly 52 also includes an outer retainer 62 with a channel 64 between the outer retainer 62 and the central divider 56. The channels 60, 64 are sized to receive a lower end of the shower door pane 24 and a shower door pane 66 of a second shower door subassembly 68 respectively.

Figure 7:
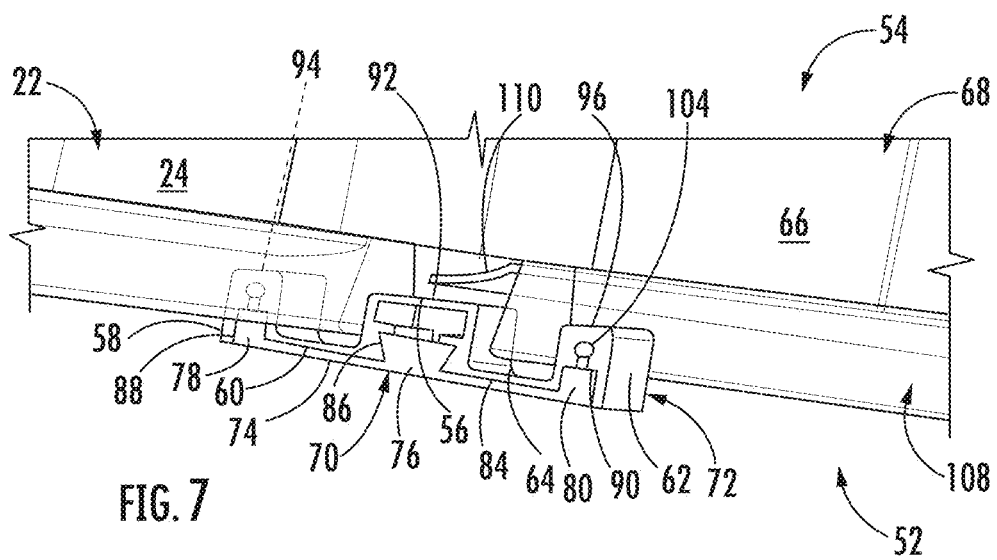
FIG. 7 is a side perspective view of the guide assembly of FIG. 4, illustrated partially disassembled and in cooperation with the shower door assembly.

The channels 60, 64 are sized to prevent rotation of the shower door panes 24, 66 relative to the top track 18 as illustrated in FIG. 7. The retainers 58, 62 overlap the shower door panes 24, 66 by a dimension that is designed to be large enough so that the if the shower door subassemblies 22, 68 are lifted relative to the track 18, the lower end of each shower door pane 24, 66 is still retained within the channel 60, 64. The overlap prevents the shower door subassemblies 22, 68 from being pivoted relative to the top track 18, which may consequently result in disassembly of the shower door assembly 10.

Figure 4:
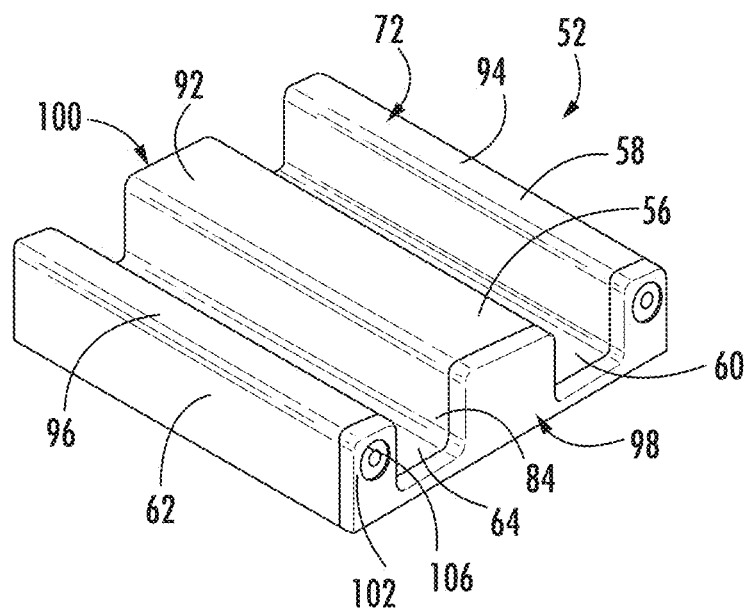
FIG. 4 is a perspective view of a guide assembly of the shower door assembly of FIG. 1.
Figure 6:
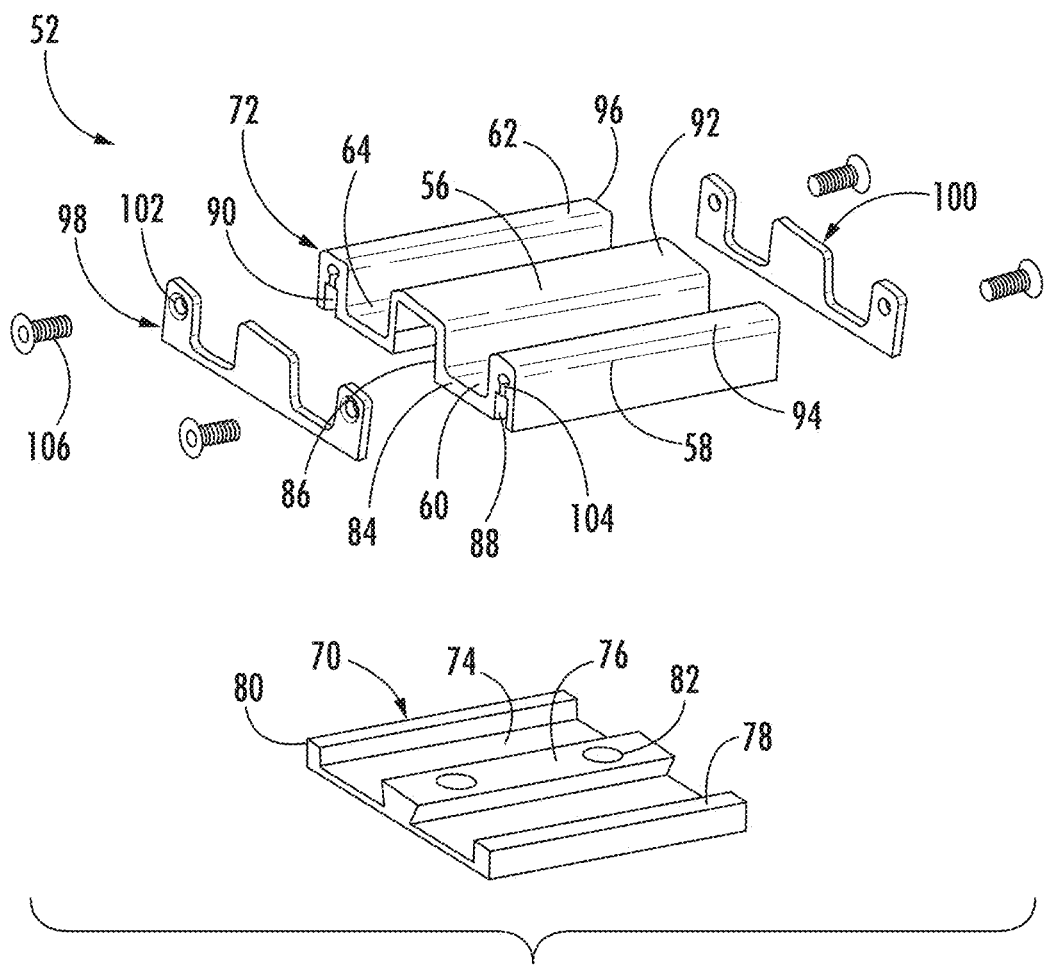
FIG. 6 is an exploded perspective view of the guide assembly of FIG. 4.

The guide assembly 52 is a multicomponent assembly for ease in installation and assembly of the shower door assembly 10. The guide assembly 52 includes a bracket 70 as illustrated in FIGS. 6 and 7, and a guide 72 as illustrated in FIGS. 4, 6 and 7. With reference now to FIGS. 6 and 7, the bracket 70 may be formed of a structurally suitable material, such as a polymer or a metallic alloy. For example, the bracket 70 may be formed from extruded aluminum. The bracket 70 includes a substrate 74 that is sized to be supported upon the sill 17. The bracket 70 includes a plurality of lengthwise keys 76, 78, 80 extending upward from the substrate 74. The center key 76 is formed tapered to widen away from the substrate 74 to provide a lengthwise retainer. The inner key 78 and the outer key 80 are each sized to provide support to the guide 72. The inner key 78 and the outer key 80 may be formed symmetrically so that the bracket 70 can be installed facing either lengthwise direction.

The bracket 70 includes a pair of apertures 82 formed through the center key 76. The apertures 82 are sized for receipt of fasteners to fasten the bracket 70 to the sill 17. The apertures 82 may be countersunk to receive the heads of the fasteners. During installation of the shower door subassemblies 22, 68, the bracket 70 may be installed to the sill 17 without interference of the shower door panes 24, 66. The keys 76, 78, 80 have a limited height to avoid contact with the shower door panes 24, 66. Therefore, shower door subassemblies 22, 68 can be hung to the top track 18 after the bracket 70 is installed without interference with the bracket 70.

Referring now to FIGS. 4-7, the guide 72 includes a body 84 with a series of lengthwise projections from the body 84 that form the central divider 56 and the inner and outer retainers 58, 62 with the channels 60, 64. The guide 72 is formed from a structurally suitable material, such as a polymer or a metallic alloy. For one example, the guide 72 is extruded from an aluminum alloy. With reference again to FIGS. 6 and 7, a central portion of the body 84 is formed with a tapered keyway 86 that is sized to receive the center key 76 of the bracket 70. The central keyway 86 is widened into the depth of the central divider 56. The central keyway 86 provides a lengthwise retainer to lock the guide 72 in a vertical direction relative to the bracket 70, and in an ingress/egress direction of the shower stall 12.

The guide 72 includes keyways 88, 90 formed underneath the inner and outer retainers 58, 62. The inner and outer keyways 88, 90 are sized to receive the keys 78, 80. The keys 78, 80 provide additional support beneath the inner and outer retainers 58, 62. The keys 76, 78, 80 and the keyways 86, 88, 90 are symmetrical so that the guide 72 can be installed in either length direction upon the bracket 70.

Referring now to FIGS. 4-7, the central divider 56 includes a top surface 92 that is angled with a decline in one direction. The decline of the top surface 92 is gradual and is readily apparent in the side view of FIG. 5. The guide 72 is installed so that the top surface 92 is angled toward the shower stall 12 so that water runs off the guide 72 toward the shower stall 12. Likewise, the inner and outer retainers 58, 62 also include top surfaces 94, 96 that are angled to decline toward the shower stall 12 so that water runs toward the shower stall 12.

Referring now to FIG. 7, after the shower door subassemblies 22, 68 are installed to the top track 18, the guide 72 is slid lengthwise onto the bracket 70 concealing the bracket 70 and the fastener apertures 82. Due to the engagement of the central key 76 and the central keyway 86, the guide 72 is retained in the vertical direction, and in a direction of ingress and egress through the shower door opening of the shower stall 12.

Figure 5:
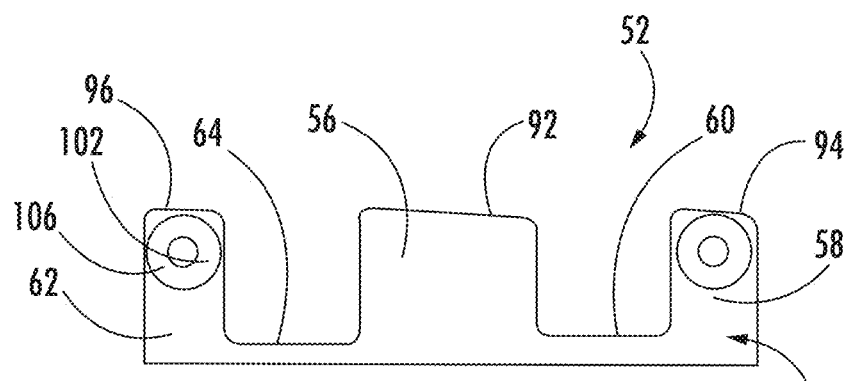
FIG. 5 is a side elevation view of the guide assembly of FIG. 4.

FIGS. 4-6 illustrate that the guide assembly 52 includes a pair of side plates 98, 100. Each side plate 98, 100 has an area sized to match and cover an overall side profile of the combined bracket 70 and the guide 72. Each side plate 98, 100 forms a terminal portion of the central divider 56, the inner and outer retainers 58, 62, and the channels 60, 64. A pair of apertures 102 are formed in each of the side plates 98, 100, aligned with the inner and outer retainers 58, 62. As illustrated in FIGS. 6 and 7, an arcuate slot 104 is formed within each retainer 58, 62 of the guide 72, intersecting the corresponding keyway 88, 90. Referring back to FIGS. 4-6 a plurality of fasteners 106 are installed into the apertures 102 and the slots 104 to fasten the side plates 98, 100 to the guide 72. During installation, the installer can slide both shower door subassemblies 22, 68 to one side to install one side plate 98, 100. Then the installer can slide both shower door subassemblies 22, 68 to the other side to install the other side plate 98, 100.

The side plates 98, 100 have a height that is greater than a height of the guide 72. The side plates 98, 100 extend below the guide 72 and along terminal ends of the bracket 70. The side plates 98, 100 conceal the bracket 70 within the guide 72 and the side plates 98, 100. The side plates 98, 100 constrain the bracket 70 between the side plates 98, 100 to retain the guide 72 against longitudinal translation relative to the bracket 70. The side plates 98, 100 can be formed from any suitable material, such as a polymer or a metal alloy. According to one embodiment, the side plates 98, 100 are stamped from a zinc alloy.

Once the guide assembly 52 is installed and assembled, the shower door panes 24, 66 are received in the channels 60, 64 as illustrated in FIG. 7. The shower door subassemblies 22, 68 can be slid along the upper track 18 with the panes within the channels 60, 64. The center divider 56, and the inner and outer retainers 58, 62 have a sufficient height to prevent the shower door subassemblies 22, 68 from pivoting to an angle for disassembly from the track 18. Likewise, the channels 60, 64 have a depth that exceeds a range of vertical clearance of the shower door subassemblies 22, 68 relative to the track 18. Therefore, the guide assembly 52 limits the degrees of freedom of the shower door subassemblies 22, 68, such that the shower door subassemblies 22, 68 can only be slid to open and close relative to the track 18.

The guide assembly 52 ensures that the shower door subassemblies 22, 68 do not derail and are not inadvertently disassembled. The guide assembly 52 also prevents the shower door subassemblies 22, 68 from contacting each other. The guide assembly 52 also obviates a lengthwise lower dam strip, to eliminate extra material. The guide assembly 52 can be fastened directly to the sill 17. A lower trim member 108 may be provided on a lower edge of each shower door glass pane 24, 66 as illustrated in FIG. 7. The trim member 108 prevents contact of the glass panes 24, 66 with the center guide assembly 52. The trim member 108 also includes a fin 110 that extends laterally from the trim member 108 toward the shower stall 12. The fin 110 directs water that runs along the shower door panes 24, 66 toward the shower stall 12. The trim member 108 may be formed of a resilient material, such as a polymer, with polyvinylchloride (PVC) as one suitable example. The fin 110 may be formed from a relatively softer PVC for flexibility to engage the center divider 56 or the inner retainer 58 of the guide 72.

Figure 8:
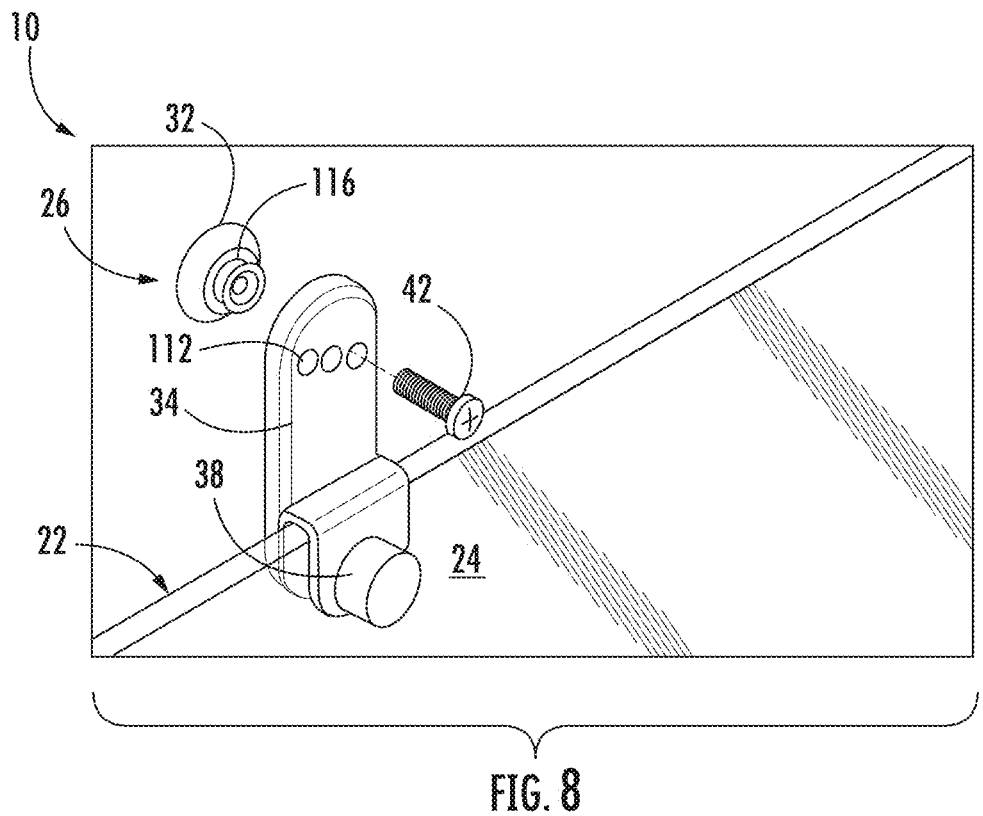
FIG. 8 is an exploded perspective view of the upper region of the shower door assembly of FIG. 1, illustrating another installation step.
Figure 9:
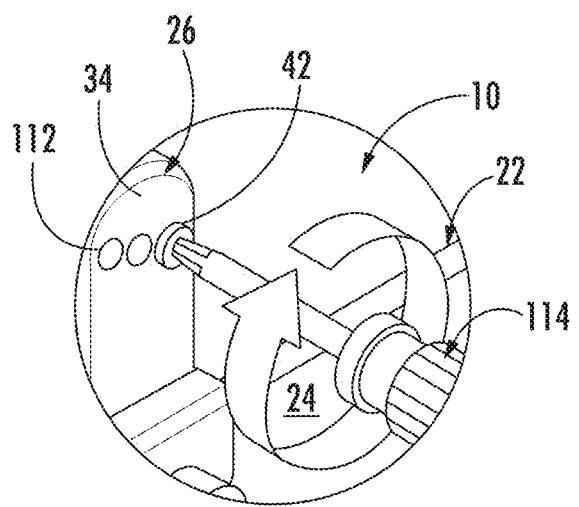
FIG. 9 is a perspective view of the upper region of the shower door assembly of FIG. 1, illustrating another installation step.

FIG. 8 illustrates the roller bracket 34 has a plurality of apertures 112 at various elevations relative to the shower door pane 24. Each of the apertures 112 is sized to receive the fastener 42 thereby permitting vertical adjustment at installation of the shower door pane 24 relative to the center guide assembly 52 to avoid any interference of the shower door pane 24 within the center guide assembly 52. FIG. 8 illustrates manual installation with a tool 114 of the fastener 42 through one of the apertures 112, and consequently into a post 116 of the roller assembly 26. Installation in the lowermost aperture 112 minimizes the dimension of the overlap of the shower door pane 24 and the center guide assembly 52. Installation in the uppermost aperture 112 maximizes the dimension of the overlap of the shower door pane 24 and the center guide assembly 52. The depth of the center guide assembly 52 channels 60, 64 are designed to provide an overlap at the lowermost aperture 112 illustrated in FIG. 9.

The shower door assembly 10 incorporates structural conditions through the use of geometric restrictions and sequentially ordered assembly methods such that no additional components or fixtures are necessary to fully retain the wheels 32 of a shower door subassembly 22 into the top track 18. The inability of the shower door subassembly 22 to be removed from the assembled shower door assembly 10 by accident is often referred to as an anti-jump mechanism. This terminology comes from the characterization of a roller assembly 26 "jumping" off, or out of, the channel 30 of the top track 18. The prior art has offered additional structural components added to the shower door assemblies 10 to prevent inadvertent disassembly. By control of geometries, dimensions and assembly sequences, additional hardware is omitted thereby reducing cost, simplifying installation, and improving aesthetics of the shower door assembly 10.

In order to disassemble the shower door assembly 10, the side plates 98, 100 and the guide 72 are first removed before the first shower door subassembly 22 can be pivoted to remove the wheels 32 from the top track 18.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A shower door assembly comprising:
   a track sized to extend across a shower door opening;
   a shower door pane sized to cooperate with the track for translation relative to the track, wherein the shower door pane has a range of clearance relative to the track for installation and disassembly of the shower door pane relative to the track; and
   a guide sized to be installed to the shower door opening, the guide having at least one channel formed therein to receive the shower door pane for translation relative to the guide, wherein a depth of the channel exceeds the range of clearance of the shower door pane relative to the track; a bracket sized to be fastened to the shower door opening, the bracket having a first lengthwise retainer; and wherein the guide further comprises a second lengthwise retainer sized to be retained by the first lengthwise retainer of the bracket; and a pair of side plates, each sized to be fastened to an end of the guide or the bracket to limit translation of the guide relative to the bracket.

2. The shower door assembly of claim 1 wherein at least one mounting aperture is formed through the bracket; and wherein the guide conceals the at least one mounting aperture.

3. The shower door assembly of claim 1 wherein the first lengthwise retainer and the second lengthwise retainer further comprise a tapered key and a body portion with a tapered keyway to retain the guide upon the bracket.

4. The shower door assembly of claim 3 wherein the first lengthwise retainer further comprises the tapered key.

5. The shower door assembly of claim 4 wherein at least one mounting aperture is formed through the tapered key of the bracket.

6. The shower door assembly of claim 1 wherein the guide further comprises a pair of lengthwise projections extending upward from the guide with the channel formed therebetween.

7. The shower door assembly of claim 6 wherein the pair of lengthwise projections each comprise an external surface spaced apart from the bracket and angled to direct water.

8. The shower door assembly of claim 1 wherein the first lengthwise retainer extends in a lengthwise direction.

9. The shower door assembly of claim 8 wherein the lengthwise direction corresponds to a direction of translation of the shower door pane.

10. The shower door assembly of claim 8 wherein the second lengthwise retainer is sized to be installed to the first lengthwise retainer by lengthwise translation.

11. The shower door assembly of claim 1 wherein the second lengthwise retainer locks the guide in a vertical direction relative to the bracket, and in a direction of ingress and egress of the shower door opening.

12. The shower door assembly of claim 2 wherein the at least one mounting aperture is countersunk to receive a head of a fastener.

13. The shower door assembly of claim 2 wherein the at least one mounting aperture is sized to receive a fastener to fasten the bracket to a sill of the shower door opening.

14. The shower door assembly of claim 1 wherein the pair of side plates are each formed from components separate from the guide.

15. The shower door assembly of claim 14 wherein the pair of side plates are each formed from components separate from the bracket.

16. The shower door assembly of claim 1 further comprising fasteners to fasten the pair of side plates to the guide or the bracket.

17. The shower door assembly of claim 1 wherein each of the pair of side plates has an area sized to match and cover an overall side profile of the combined bracket and guide.

18. The shower door assembly of claim 1 wherein each of the pair of side plates has a height that is greater than a height of the guide.

* * * * *